United States Patent [19]

Katsumoto et al.

[11] Patent Number: 4,646,689
[45] Date of Patent: Mar. 3, 1987

[54] ENGINE INTAKE PASSAGE LENGTH VARYING DEVICE

[75] Inventors: Takehiko Katsumoto; Seiichi Oota; Taizou Kitada, all of Kyoto, Japan

[73] Assignee: Mitsubishi Jidosha Kogyo Kabushiki Kaisha, Tokyo, Japan

[21] Appl. No.: 800,104

[22] Filed: Nov. 22, 1985

Related U.S. Application Data

[63] Continuation of Ser. No. 650,021, Sep. 13, 1984, abandoned.

[30] Foreign Application Priority Data

Sep. 13, 1983 [JP] Japan .............................. 58-141806[U]
Jul. 9, 1984 [JP] Japan ................................ 59-141836

[51] Int. Cl.$^4$ ............................................ F02B 75/13
[52] U.S. Cl. ............................................... 123/52 MB
[58] Field of Search ................ 123/52 M, 52 MB, 361

[56] References Cited

U.S. PATENT DOCUMENTS

| | | | |
|---|---|---|---|
| 2,835,235 | 5/1958 | Gassmann | 123/52 M |
| 2,911,077 | 11/1959 | Carter | 123/361 |
| 3,177,854 | 4/1965 | Garcea | 123/52 M |
| 3,353,619 | 11/1967 | Lambert | 123/361 |
| 4,440,120 | 4/1984 | Butler | 123/52 M |
| 4,446,823 | 5/1984 | Bessho | 123/52 MB |
| 4,471,615 | 9/1984 | Kasuya | 123/52 M |
| 4,515,115 | 5/1985 | Okubo | 123/52 MB |

Primary Examiner—Craig R. Feinberg
Attorney, Agent, or Firm—Sughrue, Mion, Zinn, Macpeak & Seas

[57] ABSTRACT

A device for varying the effective intake passage length of an internal combustion engine having a compact and simplified structure. A cylindrical rotor is rotatably mounted coaxially within a hollow cylindrical casing. A chamber formed within the rotor is communicated with the air filter of the engine, while a second chamber, defined between the inside of the casing and the outside of the rotor, is communicated with the intake chamber of the cylinders of the engine. A partition extends between the inner wall of the casing and the outer wall of the rotor. By turning the rotor, the effective air intake passage length is varied, thereby allowing the combustion efficiency to be maximized.

9 Claims, 14 Drawing Figures

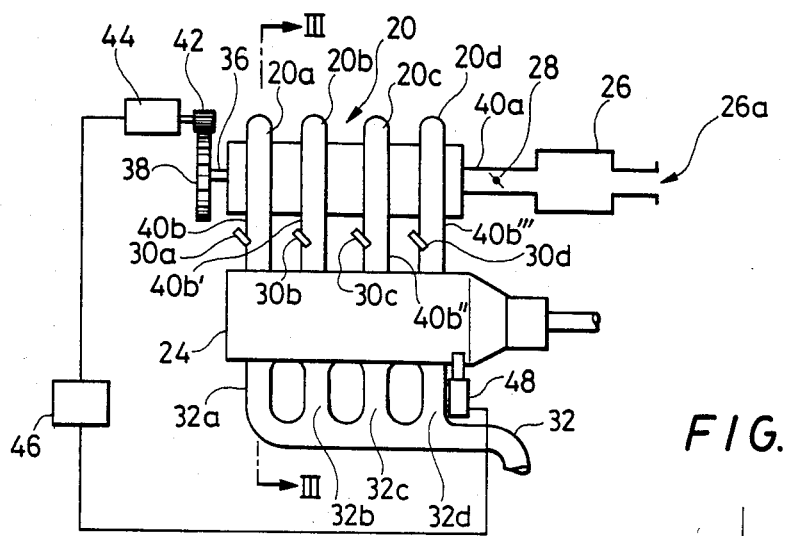
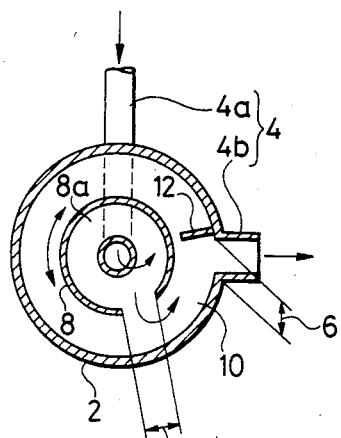
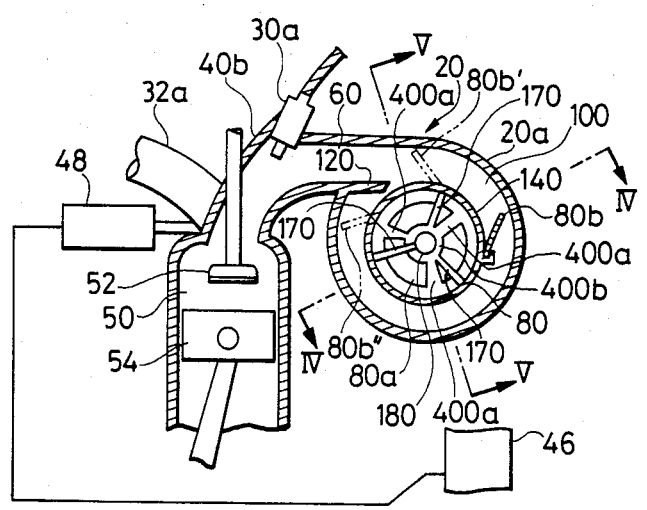

F I G. 12
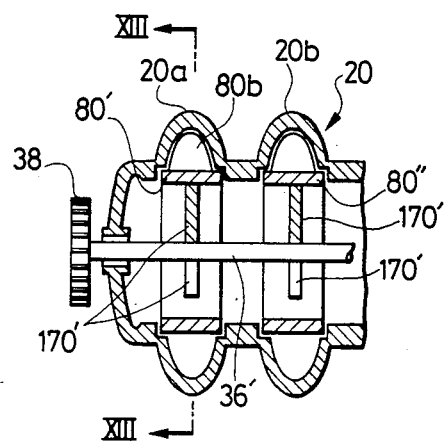
F I G. 13
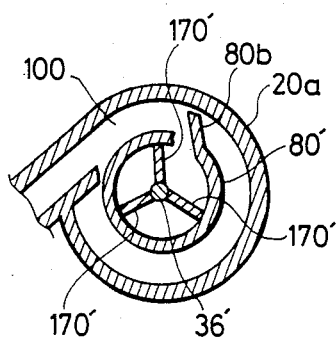

ENGINE INTAKE PASSAGE LENGTH VARYING DEVICE

This is a continuation of application Ser. No. 650,021, filed Sept. 13, 1984 now abandoned.

BACKGROUND OF THE INVENTION

The present invention relates to a device for varying the effective length of the intake pasage of an internal combustion engine.

It has been known that the charge efficiency of an internal combustion engine can be improved by controlling the length of the intake air passage in accordance with the engine speed. More specifically, it is known that a better charge efficiency can be achieved by using a longer intake passage length for lower engine speeds and a shorter intake passage length for higher engine speeds.

An example of a device which takes advantage of this principle is disclosed in Japanese Laid-Open Patent Application No. 50-20126. Therein is disclosed an intake passage length varying device in which two intake pipes are mounted coaxially, one of which is fixed and the other of which is slidable linearly with respect to the other. Although indeed capable of varying the intake passage length, this device is disadvantageous in that it requires a complicated drive and control mechanism and cannot be made compact, requiring a great deal of space for mounting.

SUMMARY OF THE INVENTION

Accordingly, it is a primary object of the present invention to provide an improved intake air passage length varying device in which the difficulties of the prior art mechanisms are avoided.

More specifically, it is an object of the present invention to provide an air intake passage length varying device which requires only a simple drive mechanism and which can be constructed compactly.

Fulfilling these and other objects of the invention, there is provided an air intake passage length varying device including a cylindrical rotor and a hollow casing in which the rotor is rotatably disposed, whereby a first air chamber is formed inside the rotor and a second air chamber is formed between the casing and the rotor extending circumferentially of the rotor. A first port is formed in the rotor to communicate the second chamber with the first chamber. A first intake passage communicates the first air chamber with either the combustion chamber of the engine or a fresh air inlet port. A second intake passage communicates the second air chamber with the other of the combustion chamber and the fresh air inlet port through a second port formed in the casing. A control device controls the rotary position of the rotor according to the rotary speed of the engine. Specifically, the rotor is rotatably positioned so that the distance from the first port to the second port through the second air chamber is varied in accordance with the rotational speed of the engine.

Further, the invention provides an air intake passage length varying device including a cylindrical rotor and a hollow casing in which the rotor is rotatably disposed, with a first air chamber being formed inside the rotor and in communication with a fresh air inlet port, and a second air chamber is formed between the casing and the rotor extending circumferentially of the rotor. A first port is formed in the rotor to communicate the second chamber with the first air chamber. A suction passage communicates the second air chamber with the combustion chamber of the engine through a second part formed in the casing. A control device controls the rotary position of the rotor according to the rotational speed of the engine. Specifically, the control device sets the rotary position of the rotor to control the angular position of the first port such that a distance from the first port to the second port through the second air chamber is varied in accordance with the rotational speed of the engine.

In this manner, the invention provides an air intake passage length varying device in which the effective length from the first port in the second air chamber to the second port is varied by changing the rotational position of the rotor which partitions the second air chamber and which is provided with the first port, thereby varying the effective length of the air intake passage to the engine.

Compared with the conventional linear sliding-type passage length varying device, the apparatus of the present invention can be manufactured in a much more compact form, and requires only a simple drive device. Also, connections to other components of the engine are simplified.

BRIEF DESCRIPTION OF THE DRAWINGS

FIG. 1 is a cross-sectional view of an air intake passage length varying device of the invention;

FIG. 2 is a schematic view of an air intake passage length varying device of the invention connected to an internal combustion engine;

FIG. 3 is a cross-sectional taken along a line III—III in FIG. 2;

FIG. 12 is a cross-sectional view showing an alternative structure of a rotor;

FIG. 13 is a cross-sectional view taken along a line XIII—XIII in FIG. 12; and

DESCRIPTION OF THE PREFERRED EMBODIMENTS

Figure 4:
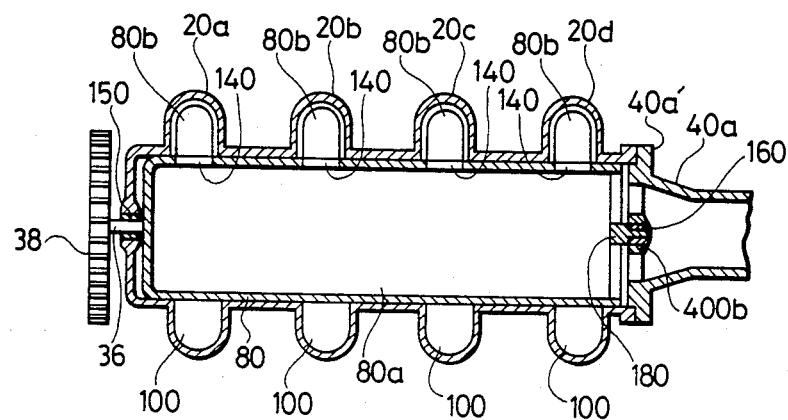
FIG. 4 is a cross-sectional view taken along a line IV—IV in FIG. 3.

Referring first to FIG. 1, a first preferred embodiment of an air intake passage length varying device of the invention will be described.

An air intake pipe 4 includes sections 4a and 4b. The section 4a debouches into one end of a cylindrical casing 2. A cylindrical rotor 8 is disposed coaxially inside the casing 2 and is rotatable in the directions indicated by an arrow. The cylindrical rotor 8 defines therein a first air chamber 8a in communication with pipe section 4a. A first port 14 is formed in the side of the rotor 8 and communicates the first air chamber 8a within the rotor 8 with a second air chamber 10 formed between the outer surface of the rotor 8 and the inner surface of the casing 2. The second air chamber 10 forms a variable length intake passage. A partition plate 12 is mounted on the inner surface of the casing 2 and extends to a line adjacent the outer surface of the rotor 8.

When the rotor 8 is rotated, the distance between the first port 14 and the second port 6 is varied so that the intake air passage length is varied accordingly.

The rotational position of the rotor 8, and hence the angular orientation of the first port 14, may be easily controlled in accordance with the rotational speed of the engine with a simple control device in such a manner that the optimum intake passage length is provided for the then-present rotational speed.

In the described embodiment, the pipe section 4a connects with the air cleaner of the engine, while the pipe section 4d communicates with the combustion chamber of the engine. However, it is possible to reverse this connection.

Next, embodiments of the invention designed for use with multi-cylinder engines will be described. In FIG. 2, reference numeral 24 denotes an engine which includes four cylinders. Reference numerals 40a, 40b, 40b', 40b'' and 40b''' designate intake pipes. The intake pipe 40a is connected at its forward end to an air cleaner 26 having a port 26a open to the atmosphere. A throttle valve 28 is located in the intake pipe 40a, the rear end of which communicates with a hollow space 80a formed within a cylindrical rotor 80, as shown in FIG. 3.

The cylindrical rotor 80 is coaxially positioned within a casing 20. The casing 20 has four annular ridges 20a, 20b, 20c and 20d formed circumferentially therein and corresponding to respective cylinders of the engine. Each of the ridges 20a, 20b, 20c and 20d defines a respective air feed chamber 100 formed around the rotor 80. The air feed chambers 100 of each of the ridges 20a, 20b, 20c and 20d are communicated with combustion chambers in respective ones of the cylinders of the engine via pipes 40b, 40b', 40b' and 40b'''. Fuel injection valves 30a, 30b, 30c and 30d are mounted in each of the pipes 40b, 40b', 40b'' and 40b''', respectively, with the nozzles of the injection valves being directed towards the intake chambers of the respective cylinders. An exhaust manifold 32, having branches 32a, 32b, 32c and 32d, communicates with the combustion chambers of the four cylinders and is constructed in a customary manner.

The casing 20 can be formed by two half-cylindrical members; that is, a cylinder sliced parallel to its longitudinal axis.

A shaft 35 is used to rotatably mount the rotor 80 to the casing 20. A gear 38 is engaged with a gear 42 of a step motor 44. The step motor 44 is rotated in response to an output from a control unit 46 to thereby set the rotational position of the rotor 80. The control unit 46 may, for instance, be implemented with a microcomputer. In this case, the microcomputer receives a signal from a distributor 48 and therefrom computes the rotational speed of the engine. From this calculation, the microcomputer outputs pulses to the step motor 44 so as to set the intake passage length to an optimum value for the then-present rotational speed.

Figure 5:
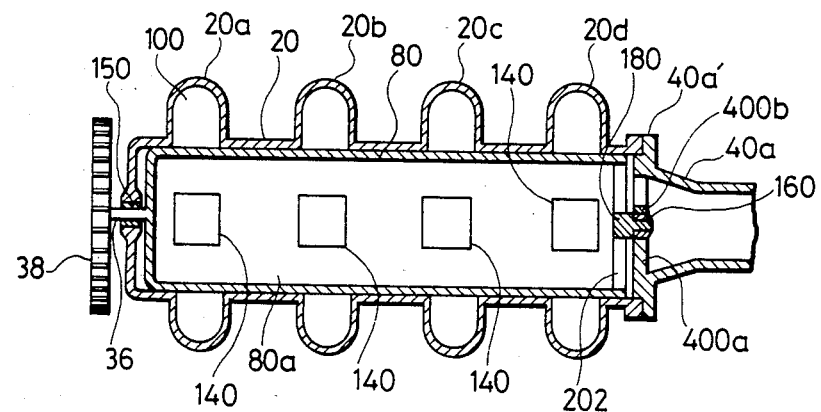
FIG. 5 is a cross-sectional view taken along a line V—V in FIG. 3.

As seen best in FIGS. 4 and 5, an opening 202 is formed in the end of the rotor opposite the gear 38. The end of the rotor 80 adjacent the gear 38 is closed. Further, the rotor 80 is provided along the cylindrical surfaces thereof with apertures which provide first ports 140 at positions corresponding to the positions of the ridges 20a, 20b, 20c and 20d.

The shaft 36 is supported by a bearing 150, while a shaft 180, fixed to the other end of the rotor 80, is supported by a bearing 160. The outer race of the bearing 160 is attached to a bearing mounting member 400b which is centrally supported on three rods 400a extending from the flange portion 40a' of the intake pipe section 40a.

Partition plates 80b, as shown in FIGS. 3 and 4, close the inner walls of the respective ridges 20a, 20b, 20c and 20d. The base of each partition plate 80b is fixed to the wall of the rotor 80 with screws of the like. Each air feed chamber 100 is further partitioned by a partition plate 120 located adjacent the second port 60.

Accordingly, the effective length between the first ports 140 and the second ports 60 can be controlled by controlling the rotational position of the rotor 80. For example, when the rotor 80 is set such that the partition plate 80b is positioned at 80b' as shown in FIG. 3, the intake passage length is short, thereby providing improved efficiency at higher engine speeds. On the other hand, when the rotor 80 is turned so that the partition plate 80b is positioned at 80b'', the intake passage length is effectively increased, thereby providing an improved combustion efficiency for lower engine speeds.

Further in FIG. 3, reference numeral 50 designates a combustion chamber of the engine which is in communication with the intake port section 40b. Reference numerals 52 and 54 designate an intake valve and a piston, respectively.

Figure 6:
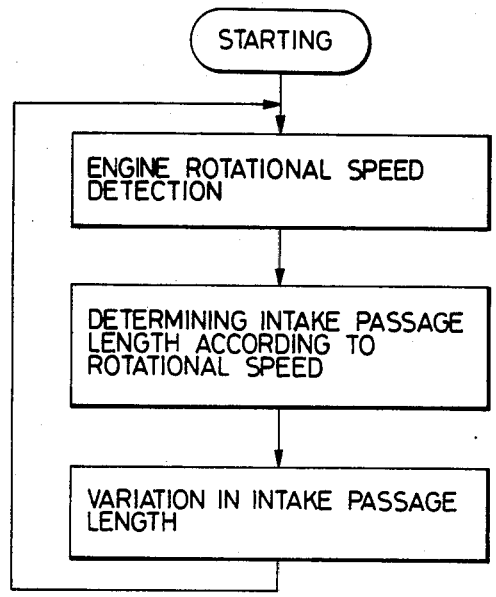
FIG. 6 is a flowchart of a control process employed with the invention.

FIG. 6 is a flowchart illustrating a control process which may be used with the invention. First, the rotational speed of the engine is detected from the output of the distributor 48. Then, the corresponding optimum intake passage length is determined from a look-up table for this speed. The look-up table may contain values which correspond directly to the desired rotational position of the rotor 80 to effect the optimum intake passage length. The actual rotational position of the rotor 80 is then compared with the desired rotational position, and pulses are applied to the step motor 44 in a number so as to cause the rotational position of the rotor 80 and the desired position to coincide.

Figure 7:
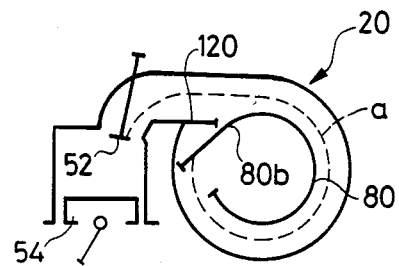
FIGS. 7, 8 and 9 are schematic views of the air intake passage length varying device of the invention and are used for explaining the manner in which the suction passage length is varied by controlling the angular position of the rotor.
Figure 8:
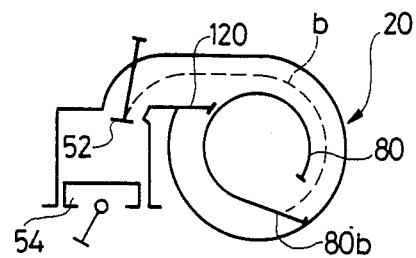
Figure 10:
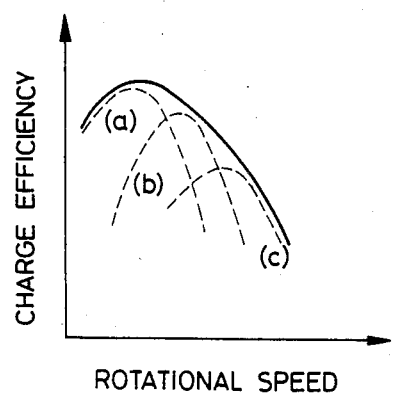
FIG. 10 is a graph showing efficiency characteristics for various rotor positions.
Figure 9:
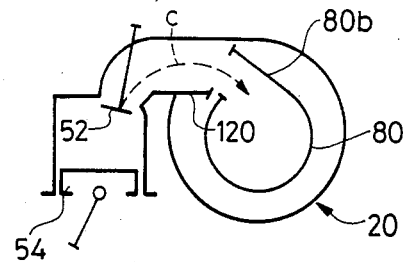

Next, referring to FIGS. 7 through 10, the relationship between the intake passage length and the combustion efficiency will be explained in detail. The intake passage a shown in FIG. 7 is the longest, the intake passage length b indicated in FIG. 7 is an intermediate value, and that c of FIG. 9 is the shortest. Combustion efficiency curves for the cases where the intake passage lengths are fixed at the lengths a, b and c are indicated by dashed lines in FIG. 10, while the solid line in FIG. 10 indicates the combustion efficiency in the case where the invention is employed. As FIG. 10 clearly illustrates, the use of the invention greatly improves the combustion efficiency over a wide range of rotational speeds.

Figure 11:
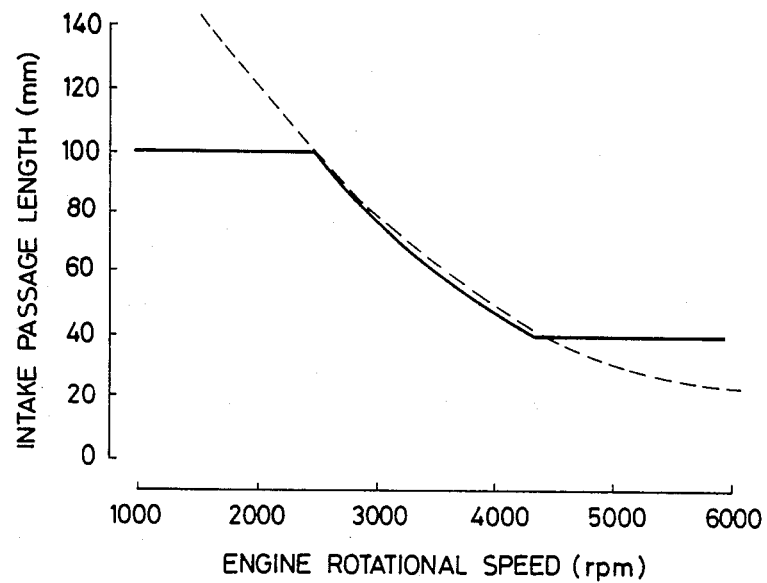
FIG. 11 is a graph plotting an example of an effective intake passage length as a function of the rotational speed of the engine.

FIG. 11 is a graph illustrating an actual example of the variation of the intake passage length with changes in engine speed.

With the aforementioned embodiment of the invention, the intake passage length varying device is made more compact than can be achieved with the conventional slide-type device. Also, the drive device is simplified, and the connections between the device and the other components of the air intake system more easily performed. Furthermore, because the rotor is rotatably supported by bearings, the apparatus of the invention is more durable than the conventional slide-type device. Since the rotor is a one-piece bottomed cylindrical member, it is easily manufactured. Still further, leakage of air from the air chambers to the space within the rotor is prevented, thus obtaining an improved supercharging effect.

In the above-described embodiment, the rotor is formed as a one-piece cylindrical member. However, other constructions can be used with the same effect. For instance, as illustrated in FIG. 12, separate cylindrical members 80, 80″, . . . can be provided for each ridge 20a, 20b, . . . , with the members 80, 80″, . . . being mounted to the shaft 36′ by spokes 170′, as illustrated in FIG. 13.

Figure 14:
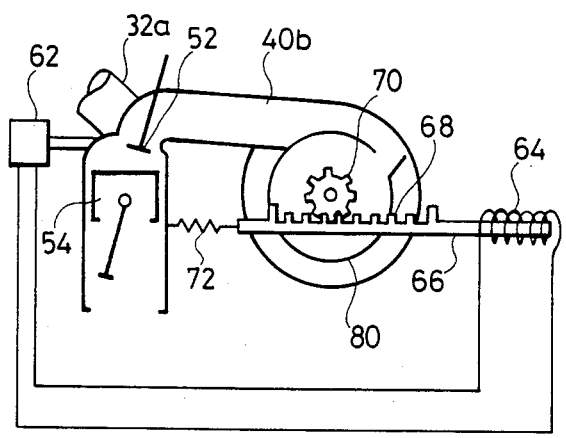
FIG. 14 is a schematic view showing an alternative form of a control device which can be used with the invention.

Moreover, as seen in FIG. 14, the rotor 80 may be turned by a rack and pinion arrangement. In this case, a rack 68 is moved by a magnetically permeable rod 66 passing through a coil 64. A pinion 70, attached to the shaft 38, meshes with the rack 68. A spring 72 biases the rod 66. The coil 64 is driven by the output of a generator 62, the latter being rotated by the output of the engine. As the speed of the engine increases, the output of the generator 62 increases, thereby causing the coil 64 to produce a stronger magnetic field. The increase in the magnetic field causes the rod 66 to move rightwardly in the figure, thereby rotation the rotor 80 counterclockwise as viewed in FIG. 14. As the rotational speed of the engine decreases, the opposite occurs.

Other modifications of the described embodiment can be contemplated. For instance, in the described embodiment, the ridges 20a, 20b, 20c and 20d are formed by the casing 20. However, the recesses may be formed in the outer peripheral surface of the rotor if desired.

This completes the description of the preferred embodiments of the invention. Although preferred embodiments have been described, it is believed that numerous modifications and alterations thereto would be apparent to one of ordinary skill in the art without departing from the spirit or scope of the invention.

We claim:

1. A device for varying an effective length of an air intake passage of an engine, comprising: a hollow cylindrical casing; a cylindrial rotor disposed coaxially within said casing and rotatably mounted with respect to and inside of said casing, and control means for rotating said rotor in response to the operational condition of the engine, wherein a first air chamber communicating with an outside air intake port is formed inside of said rotor, a second, substantially annular air chamber extending in the circumferential direction of and completely encircling said rotor is formed within the interior of said casing, said casing including at least one integrally formed partition extending into said second air chamber in proximity to a peripheral surface of said rotor and defining an effective maximal length of said second air chamber, a first communicating port formed in said rotor for normally communicating said second air chamber and said first air chamber with one another; and a second communicating port being formed for communicating between said second air chamber and an intake passage region communicating with a combustion chamber of the engine, said casing forming a substantially closed cylinder except for said second communicating port, said integrally formed partition defining at least one surface of said second communicating port, whereby when said control means rotates said rotor in response to the operational condition of the engine, said first communicating port is displaced in the circumferential direction of said rotor so that a distance from said first communicating port through said second air chamber to said second communicating port is changed.

2. The device of claim 1, wherein a partitioning member for partitioning said second air chamber is provided on said rotor so as to extend toward said casing in the vicinity of said first communicating port.

3. The device of claim 1, wherein a partitioning member for partitioning said second air chamber is provided in said casing, so as to extend toward said rotor, in the vicinity of said second communicating port.

4. The device of claim 1, said control means comprising a stepper motor for rotating said rotor, and control signal generating means for detecting the rotational speed of the engine and for applying a command signal for rotating said rotor to said stepper motor on the basis of said detection, wherein, as the rotational speed of the engine increases, said stepper motor rotates said rotor so that the distance from said first communicating port through said second air chamber to said second communicating port is reduced.

5. The device of claim 2, said control means comprising a stepper motor for rotating said rotor, and control signal generating means for detecting the rotational speed of the engine and for applying a command signal for rotating said rotor to said stepper motor on the basis of said detection, wherein as the rotatioal speed of the engine increases, said stepper motor rotates said rotor so that the distance from said first communicating port through said second air chamber to said second communicating port is reduced.

6. The device of claim 3, said control means comprising a stepper motor for rotating said rotor, and control signal generating means for detecting the rotational speed of the engine and for applying a command signal for rotating said rotor to said stepper motor on the basis of said detection, wherein as the rotational speed of the engine increases, said stepper motor rotates said rotor so that the distance from said first communicating port through said second air chamber to said second communicating port is reduced.

7. The device of claim 1, wherein said control means comprises a linear solenoid for adjusting an engagement position of a rack member with a pinion gear provided on said rotor, and generator means rotated by the engine for supplying electric power to said linear solenoid, whereby, as the rotational speed of the engine increases, said rack member increasingly rotates said rotor, via said pinion gear, so that the distance from said first communicating port through said second air chamber to said second communicating port is reduced.

8. The device of claim 2, wherein said control means comprises a linear solenoid for adjusting an engagement position of a rack member with a pinion gear provided on said rotor, and generator means rotated by the engine for supplying electric power to said linear solenoid, whereby, as the rotational speed of the engine increases, said rack member increasingly rotates said rotor, via said pinion gear, so that the distance from said first communicating port through said second air chamber to said second communicating port is reduced.

9. The device of claim 3, wherein said control means comprises a linear solenoid for adjusting an engagement position of a rack member with a pinion gear provided on said rotor, and generator means rotated by the engine for supplying electric power to said linear solenoid, whereby, as the rotational speed of the engine increases, said rack member increasingly rotates said rotor so that the distance from said first communicating port through said second air chamber to said second communicating port is reduced.

* * * * *